(12) United States Patent
Cha et al.

(10) Patent No.: US 11,993,195 B2
(45) Date of Patent: May 28, 2024

(54) MOBILITY CAPABLE OF STORING PERSONAL TRANSPORTATION

(71) Applicants: Hyundai Motor Company, Seoul (KR); Kia Corporation, Seoul (KR)

(72) Inventors: Dong Eun Cha, Hwaseong-Si (KR); Sang Heon Lee, Seoul (KR); Jin Ho Hwang, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/692,885

(22) Filed: Mar. 11, 2022

(65) Prior Publication Data

US 2023/0001840 A1 Jan. 5, 2023

(30) Foreign Application Priority Data

Jun. 30, 2021 (KR) .......................... 10-2021-0085506

(51) Int. Cl.
| | |
|---|---|
| *B60P 3/07* | (2006.01) |
| *B60L 53/30* | (2019.01) |
| *B60R 25/24* | (2013.01) |
| *B62H 3/08* | (2006.01) |
| *H04W 4/44* | (2018.01) |
| *B60W 60/00* | (2020.01) |

(Continued)

(52) U.S. Cl.
CPC ................. *B60P 3/07* (2013.01); *B60L 53/30* (2019.02); *B60R 25/24* (2013.01); *B62H 3/08* (2013.01); *H04W 4/44* (2018.02); *B60W 60/00256* (2020.02); *B62H 2003/005* (2013.01); *B62K 15/006* (2013.01); *B62K 2202/00* (2013.01)

(58) Field of Classification Search
CPC .. B60P 3/07; H04W 4/44; B60L 53/30; B60R 25/24; B62H 3/08; B62H 2003/005; B60W 60/00256; B62K 15/006; B62K 2202/00
See application file for complete search history.

(56) References Cited

U.S. PATENT DOCUMENTS 5,579,973 A * 12/1996 Taft .......................... B60R 9/06
224/495
11,366,470 B2 * 6/2022 Panigrahi ................ B60L 53/64
(Continued)

FOREIGN PATENT DOCUMENTS

| JP | 2003-201767 | 7/2003 |
|---|---|---|
| JP | 2003-341568 | 12/2003 |

(Continued)

*Primary Examiner* — Thomas D Alunkal
(74) *Attorney, Agent, or Firm* — MORGAN, LEWIS & BOCKIUS LLP (57) ABSTRACT

A mobility for storing a personal transportation includes a first storage unit formed on a side of the mobility and configured for storing the personal transportation therein without folding thereof; a second storage unit formed on a side of the mobility and configured for storing the personal transportation therein after the personal transportation is folded; a controller configured to control the first storage unit and the second storage unit in response to a mobility user's request; and a server configured to receive information related to whether the first storage unit and the second storage unit are used, and a remaining battery capacity, use time, and movable distance of the stored personal transportation from the controller, and to communicate with the mobility user.

17 Claims, 7 Drawing Sheets

(51) Int. Cl.
*B62H 3/00* (2006.01)
*B62K 15/00* (2006.01)

(56) References Cited

U.S. PATENT DOCUMENTS

| | | | | |
|---|---|---|---|---|
| 2010/0282527 | A1* | 11/2010 | Fishbein | B62K 5/007 |
| | | | | 414/809 |
| 2013/0299258 | A1* | 11/2013 | Moldestad | B62K 15/008 |
| | | | | 280/260 |
| 2018/0126892 | A1* | 5/2018 | Souschek | B62K 15/006 |
| 2021/0061124 | A1* | 3/2021 | Kim | B60L 53/80 |
| 2021/0080953 | A1* | 3/2021 | Kuo | G05D 1/0088 |

FOREIGN PATENT DOCUMENTS

| | | |
|---|---|---|
| KR | 10-0871971 | 12/2008 |
| KR | 10-1064750 | 9/2011 |
| KR | 10-1523936 | 5/2015 |
| KR | 10-2186981 | 12/2020 |
| KR | 10-2233272 | 3/2021 |

\* cited by examiner

MOBILITY CAPABLE OF STORING PERSONAL TRANSPORTATION

CROSS REFERENCE TO RELATED APPLICATION

The present application claims priority to Korean Patent Application No. 10-2021-0085506 filed on Jun. 30, 2021, the entire contents of which is incorporated herein for all purposes by this reference.

BACKGROUND OF THE INVENTION

Field of the Invention

The present invention relates to a mobility capable of storing a personal transportation, such as a Segway or an electric kickboard. A purpose built vehicle (PBV) is an autonomous driving mobility which is changed into various forms and functions depending upon the use, and an individual may enjoy leisure or relaxation inside the PBV while moving, and the PBV may serve as a public transportation used by many people. The present invention relates to a mobility which may move to the PBV mobility using the personal transportation, move a long distance using the PBV mobility, and move up to a final destination using the personal transportation again by linking the personal transportation with the PBV mobility, as the use of a personal transportation capable of moving a short distance quickly and conveniently is rapidly increased.

Description of Related Art

A purpose built vehicle (PBV) is an autonomous driving mobility which is changed into various forms and functions depending upon the use, an individual may enjoy leisure or relaxation inside the PBV while moving, and the PBV may serve as a public transportation used by many people.

Recently, as an environmental pollution problem and a traffic congestion problem due to the use of an internal combustion engine are on the rise, a personal transportation (a Segway or an electric kickboard) capable of quickly moving a short distance without environmental pollution are attracting attention.

When the personal transportation is appropriately linked with the PBV mobility, the person transportation may be one movement method capable of quickly moving from an origin to a destination.

However, the user's hands are not free due to the personal transportation in loading the personal transportation with the user inside the mobility, and the personal transportation may be piled up in disorder, and therefore, a space inside the mobility becomes congested and the utilization of the space is very low. Furthermore, theft of the personal transportation may also be a problem.

To solve the above problems, there is a demand for a mobility provided with a space capable of loading the personal transportation.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a mobility configured for storing a personal transportation that includes a first storage unit formed on a side of the mobility and configured for storing the personal transportation therein without folding thereof; a second storage unit formed on a side of the mobility and configured for storing the folded personal transportation; a controller configured to control the first storage unit and the second storage unit in response to a mobility user's request; and a server configured to receive information related to whether the first storage unit and the second storage unit may be used, and a remaining battery capacity, use time, and movable distance of the stored personal transportation from the controller, and to communicate with the mobility user.

A mobility for storing a personal transportation according to various exemplary embodiments of the present invention for achieving the object includes a first storage unit formed on a side of the mobility and configured for storing the personal transportation therein without folding thereof; a second storage unit formed on a side of the mobility and configured for storing the personal transportation therein after the personal transportation is folded; a controller configured to control the first storage unit and the second storage unit in response to a mobility user's request; and a server configured to receive information related to whether the first storage unit and the second storage unit are usable, and a remaining battery capacity, use time, and movable distance of the stored personal transportation from the controller, and to communicate with the mobility user.

The first storage unit and the second storage unit may be provided with a charger configured for charging the personal transportation.

The first storage unit may include a first storage space storing the personal transportation and formed inside a seat of the mobility and an entrance, through which the personal transportation enters or exits, formed outside the mobility, and the second storage unit may include a housing storing the folded personal transportation; and a second storage space storing the housing and formed inside the mobility.

A personal transportation entrance auxiliary panel hingedly coupled to a lower end portion of the first storage unit may be provided.

The entrance may be opened or closed vertically.

A first guide rail configured to guide a movement direction of the housing may be fixed and formed in the second storage space; and the housing may be formed with a second guide rail configured to move the housing along the first guide rail.

The second storage space may be provided with a motor configured to move the second guide rail forward or backward in accordance with a control of the controller.

An upper end portion of the second storage unit may be provided with a radiation unit and after the mobility stops, the radiation unit may radiate a receiving position of the personal transportation on the ground.

The outsides of the entrance of the first storage unit and the housing of the second storage unit may be provided with identification marks configured for identifying a storage position of the personal transportation.

One sides of the first storage unit and the second storage unit may be provided with identification marks configured for identifying a storage position of the personal transportation.

The identification mark may be provided with a flashing light, and after the mobility stops, the flashing light of the identification mark may flash such that the mobility user recognizes a position at which the personal transportation may be stored.

After the mobility stops, the flashing light of the identification mark may flash such that the mobility user recognizes a storage position of an available personal transportation.

The server may inform the mobility user of an available personal transportation stored in the first storage unit or the second storage unit or inform the mobility user of the first storage unit or the second storage unit, which is currently empty, and the controller may receive the mobility user's request from the server to control the first storage unit or the second storage unit.

The controller may receive the mobility user's request from the server to control the first storage unit or the second storage unit so that the first storage unit or the second storage unit is opened or closed.

The controller may receive the mobility user's request from the server to control the charger to charge the personal transportation stored in the first storage unit or the second storage unit.

The present invention has advantages in that movement convenience is maximized by linking the personal transportation with the PBV mobility, the space utilization inside the PBV mobility may be increased, and the space of storing the personal transportation may be used as the space of storing other articles, and therefore, the use is very flexible.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a specific description for solving the aforementioned object and problems will be described in detail with reference to the accompanying drawings. Meanwhile, in understanding the present invention, when a detailed description of a known technology in the same field is not helpful in understanding the core content of the present invention, the description will be omitted, and the technical spirit of the present invention is not limited thereto and changed by those skilled in the art and therefore, the present invention may be variously implemented.

Figure 1:
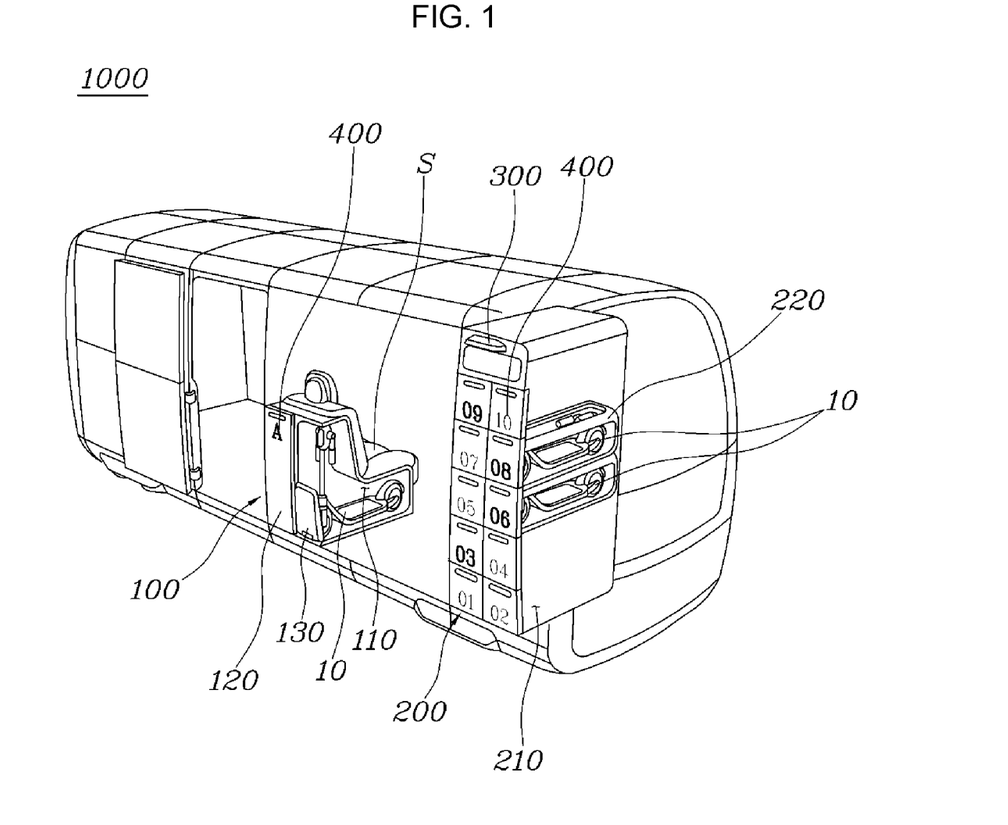
FIG. 1 illustrates a mobility configured for storing a personal transportation according to various exemplary embodiments of the present invention.
Figure 2A:
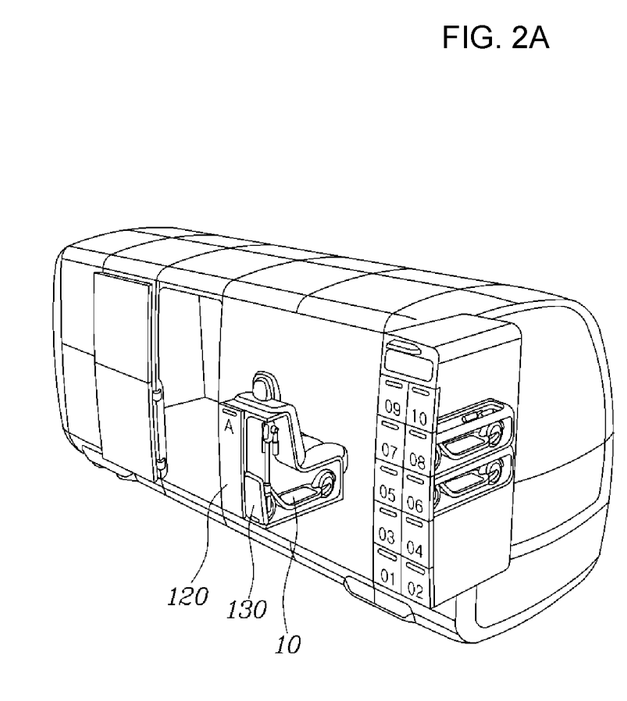
FIG. 2A and FIG. 2B illustrate a first storage unit and a second storage unit of the mobility configured for storing the personal transportation according to the exemplary embodiment of the present invention.
Figure 2B:
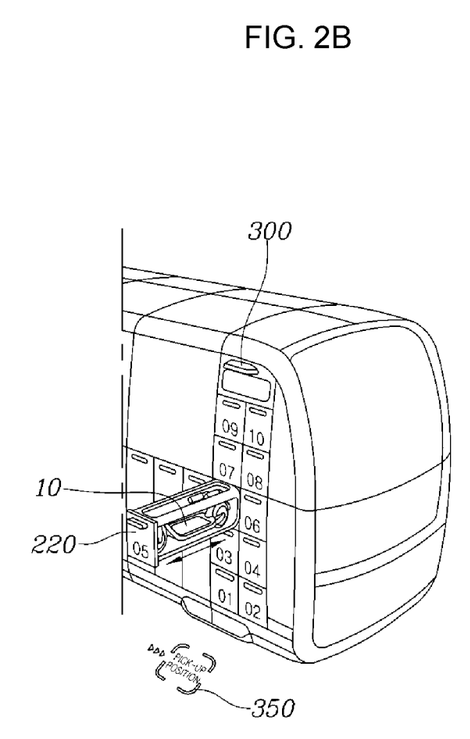
Figure 3:
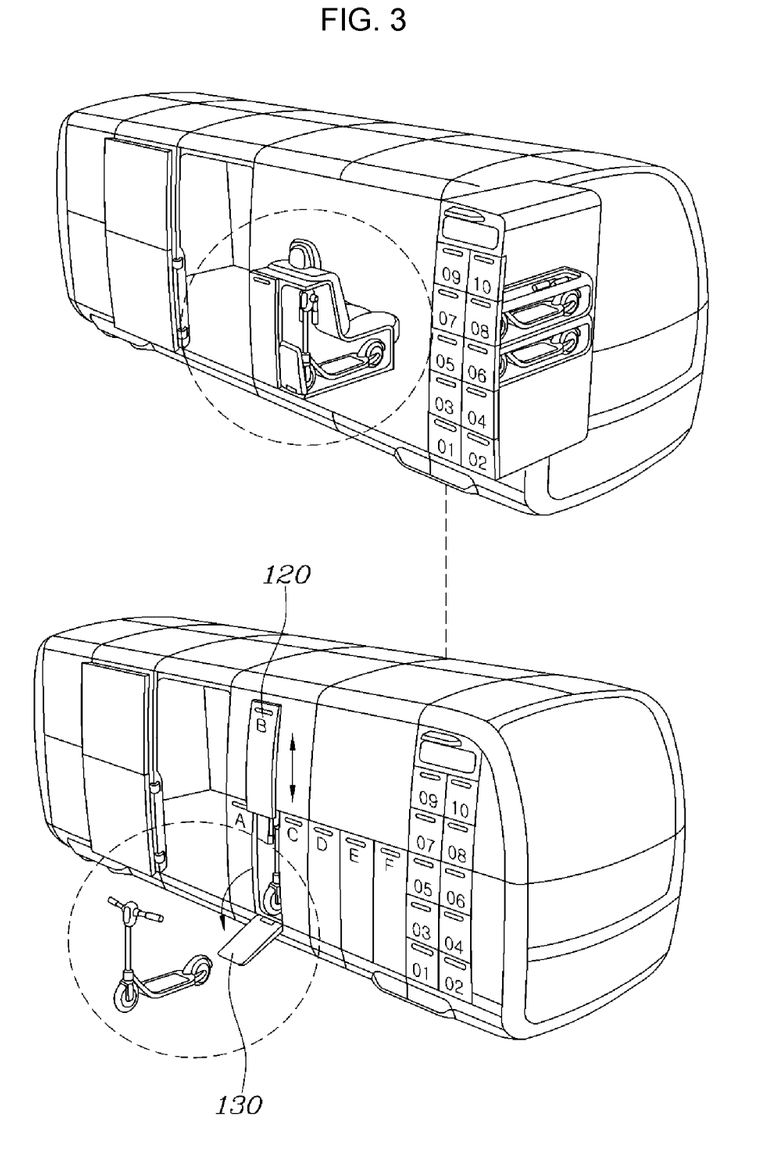
FIG. 3 illustrates an operation of the first storage unit of the mobility configured for storing the personal transportation according to the exemplary embodiment of the present invention.
Figure 4A:
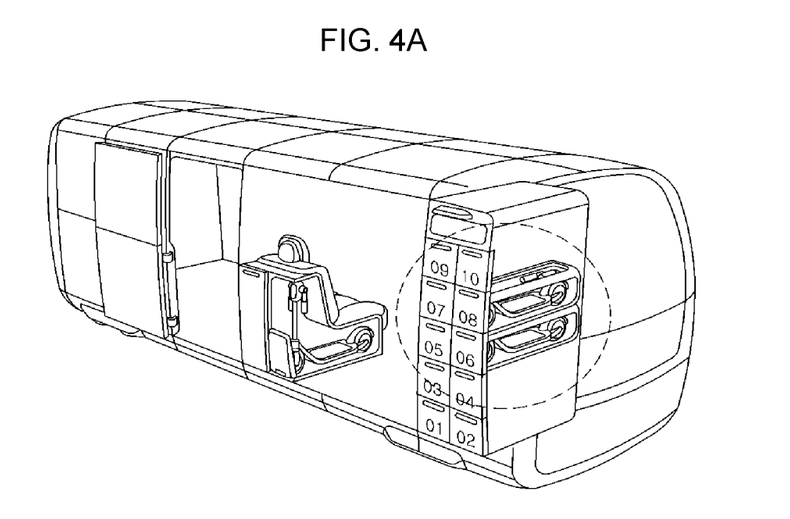
FIG. 4A and FIG. 4B illustrate an operation of the second storage unit of the mobility configured for storing the personal transportation according to the exemplary embodiment of the present invention.
Figure 4B:
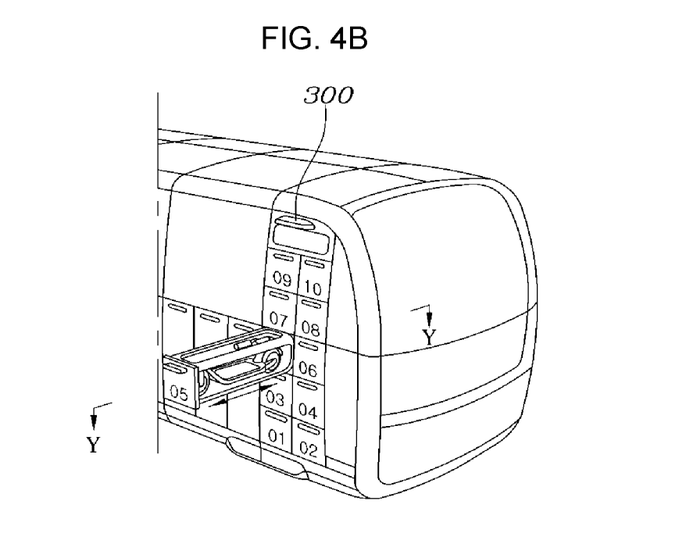
Figure 5:
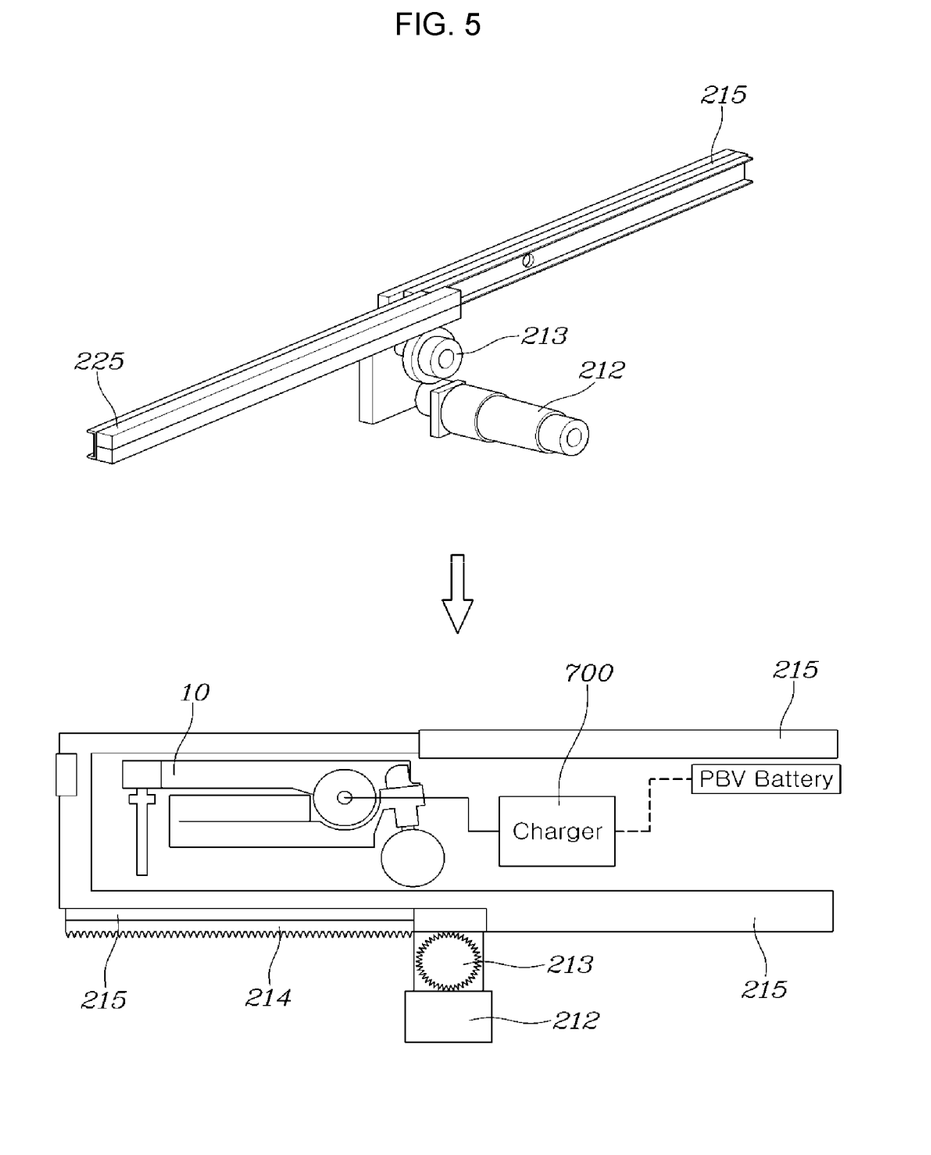
FIG. 5 illustrates a cross section taken along line Y-Y of FIG. 4.

FIG. 1 illustrates a mobility configured for storing a personal transportation according to various exemplary embodiments of the present invention, FIG. 2A and FIG. 2B illustrate a first storage unit and a second storage unit of the mobility configured for storing the personal transportation according to the exemplary embodiment of the present invention, FIG. 3 illustrates an operation of the first storage unit of the mobility configured for storing the personal transportation according to the exemplary embodiment of the present invention, FIG. 4A and FIG. 4B illustrate an operation of the second storage unit of the mobility configured for storing the personal transportation according to the exemplary embodiment of the present invention, FIG. 5 illustrates a cross section taken along line Y-Y of FIG. 4, and FIG. 6, FIG. 7, and FIG. 8 illustrate a server and a controller of the mobility configured for storing the personal transportation according to the exemplary embodiment of the present invention.

A purpose built vehicle (PBV) is an autonomous driving mobility which is changed into various forms and functions depending upon the use, an individual may enjoy leisure or relaxation inside the PBV while moving, and the PBV is configured as a public transportation used by many people.

Recently, as an environmental pollution problem and a traffic congestion problem due to the use of an internal combustion engine are on the rise, a personal transportation (a Segway or an electric kickboard) configured for rapidly moving a short distance without environmental pollution are attracting attention.

When the personal transportation is appropriately linked with the PBV mobility, the person transportation may be one movement method configured for rapidly moving from an origin to a destination.

However, the user's hands are not free due to the personal transportation in loading the personal transportation with the user inside the mobility, and the personal transportation may be piled up in disorder, and therefore, a space inside the mobility becomes congested and the utilization of the space is very low. Furthermore, theft of the personal transportation may also be a problem.

To solve the above problems, there is a demand for a mobility provided with a space configured for loading the personal transportation.

The present applicant has invented a mobility 1000 configured for storing a personal transportation 10 according to various exemplary embodiments of the present invention for achieving the object. The present invention includes a first storage unit 100 formed on a side of a mobility 1000 and configured for storing a personal transportation 10 without folding; a second storage unit 200 formed on one side of the mobility 1000 and configured for storing the personal transportation 10 after the personal transportation 10 is folded; a controller 500 configured to control the first storage unit 100 and the second storage unit 200 in response to a mobility user's request; and a server 600 configured to receive information related to whether the first storage unit 100 and the second storage unit 200 may be used, and a remaining battery capacity, use time, and movable distance of the stored personal transportation 10 from the controller 500, and to communicate with the user.

The personal transportation 10 refers to a transportation, such as a Segway, an electric kickboard, or an electric bicycle. The personal transportation 10 may be a commercialized shared kickboard or shared electric bicycle as well as one purchased by an individual. The mobility 1000 is provided with a space configured for storing a personal or shared transportation, and the user may store the shared transportation or take out and use the shared transportation after getting off the mobility 1000. In other words, the mobility 1000 configured for storing the personal transportation according to various exemplary embodiments of the present invention may be used as a space of returning the shared transportation, and used as a space of storing the transportation for a long time in a condition, such as bad weather where the transportation may not be used.

Referring to FIGS. 1 to 6, the mobility 1000 according to various exemplary embodiments of the present invention may store the personal transportation 10 in two types. The first storage unit 100 stores the personal transportation 10 without folding, and the second storage unit 200 folds and stores the personal transportation 10. By selecting two types of storage methods it is possible to maximize the internal space utilization of the mobility 1000. In other words, the first storage unit 100 configured to store the personal transportation 10 without folding may form a first storage space 110 configured for storing the personal transportation 10 on a seat (S) of the mobility 1000, increasing the space utilization. Since the user may move continuously using the transportation from an origin to a destination by linking the mobility 100 and the personal transportation 10, the user may reach the destination within a short time period even when not using his or her vehicle.

Furthermore, a space configured for storing the personal transportation 10 is provided inside the mobility 1000, and therefore, the utilization of the space inside the mobility 1000 may be maximized, and even when the user moves using the mobility, the personal transportation 10 is taken out from the first storage unit 100 or the second storage unit 200 depending upon the user's request, and therefore, may be safely stored away from the risk of theft.

Figure 7:
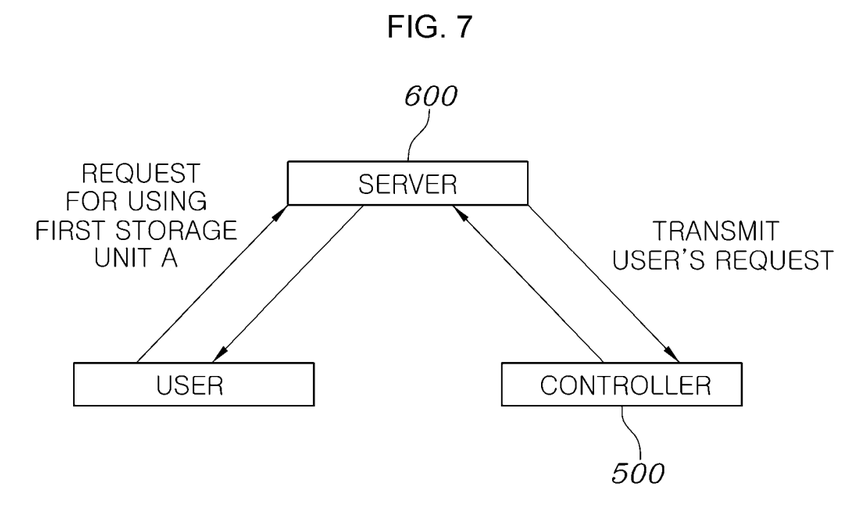
Figure 8:
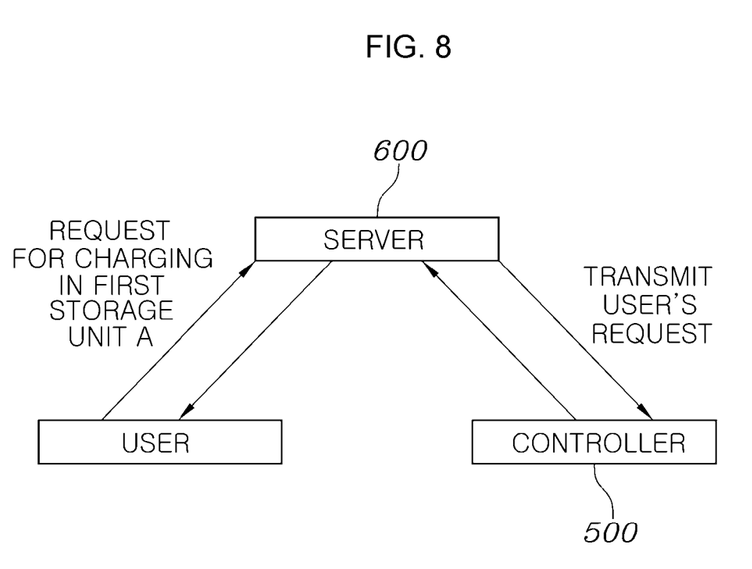

Meanwhile, referring to FIGS. 7 and 8, the server 600 informs the user of the available personal transportation 10 stored in the first storage unit 100 or the second storage unit 200 or informs the user of the first storage unit 100 or the second storage unit 200, which is currently empty, and the controller 500 may receive the user's request from the server to control the first storage unit 100 or the second storage unit 200. Furthermore, as described below, the controller 500 may control a flashing light such that the flashing light of an identification mark 400 flashes, or control a charger 700 to charge the personal transportation 10, and control the opening or closing of the first storage unit 100 and the second storage unit 200.

Figure 6:
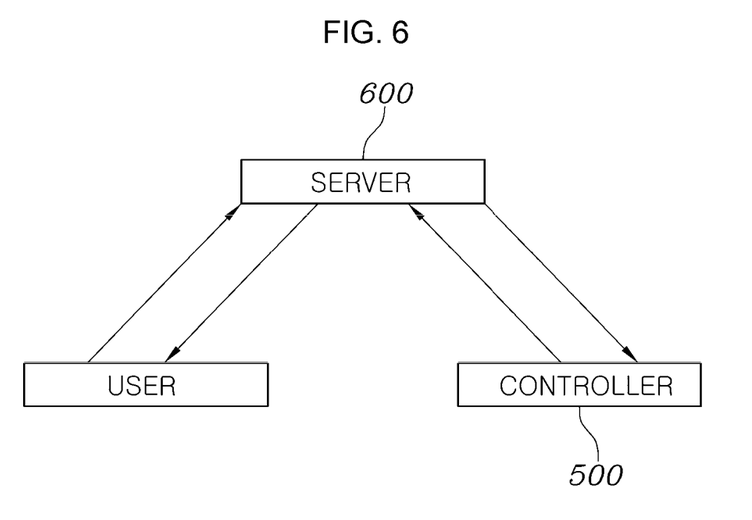
FIG. 6, FIG. 7, and FIG. 8 illustrate a server and a controller of the mobility configured for storing the personal transportation according to the exemplary embodiment of the present invention.

Meanwhile, the first storage unit 100 and the second storage unit 200 may be provided with the charger 700 configured for charging the personal transportation, and as various exemplary embodiments of the present invention, referring to the second storage unit 200 provided with the charger 700 illustrated in FIG. 6, the charger 700 configured for charging the personal transportation 10 is connected to a battery of the mobility, and may charge the personal transportation 10 by connecting the personal transportation 10 to the charger 700. Such a configuration may be adopted to allow the user to charge the battery of the personal transportation 10 even while using the mobility, strengthening the linkage between the mobility and the personal transportation to maximize the advantages of the present invention.

Referring to FIG. 1, FIGS. 2A and 2B, FIG. 3, and FIGS. 4A and 4B, the first storage unit 100 includes the first storage space 110 storing the personal transportation 10 and formed inside the seat (S) of the mobility and an entrance 120, through which the personal transportation 10 enters or exits, formed on the outside of the mobility, and the second storage unit 200 may include a housing 220 storing the folded personal transportation 10 and a second storage space 210 storing the housing 220 and formed inside the mobility.

The first storage unit 100 may include the first storage space 110 configured for storing the stand-up personal transportation, the entrance 120 through which the personal transportation 10 enters or exits, and a personal transportation entrance auxiliary panel 130 coupled to a lower end portion of the first storage unit 100 in a hinge manner. In other words, by use of the space of the seat (S) inside the mobility outside the mobility, it may be used as the space of storing the personal transportation 10. At the instant time, the entrance 120 may be opened or closed vertically, and opened or closed horizontally. However, if the entrance 120 is opened or closed horizontally, it may take a long time to store and take out the personal transportation 10 again if there are many users, and therefore, the entrance 120 is opened or closed vertically.

The second storage unit 200 includes the housing 220 configured for storing the personal transportation 10 after the personal transportation 10 is folded and laid down and the second storage space 210 storing the housing 220. The second storage unit 200 is a space configured for storing a foldable personal transportation, and may store many personal transportations 10. As described above, by adopting two types of storage methods, there are advantages in that it may make the internal space of the mobility 1000 comfortable, and two hands are free from the personal transportation when the user moves using the mobility, and therefore, there are fewer restrictions on many actions, such as taking a break.

Meanwhile, referring to FIG. 5, a first guide rail 215 configured to guide a movement direction of the housing 200 may be fixed to and formed in the second storage space 210, and the housing 220 may be formed with a second guide rail 225 configured to move the housing 220 along the first guide rail 215.

The first guide rail 215 and the second guide rail 225 are components for allowing the housing 220 to enter into or exit from the second storage space 210, in which the first guide rail 215 is fixed and formed inside the second storage space 210, the second guide rail 225 is fixed and formed in the housing 220, and the first guide rail 215 and the second guide rail 225 are formed to correspond to each other such that the housing 220 may be slid in the second storage space 210.

The second storage space 210 may be provided with an electric motor 212 configured to move the second guide rail 225 forward or backward depending upon a control of the controller 500, in which the user's request for storing the personal transportation 10 in the second storage unit 200 or using the personal transportation 10 stored in the second storage unit 200 is transmitted to the server 600, the server 600 transmits the user's request to the controller 500, and the controller 500 controls the electric motor 212 depending upon the user's request to slide the housing 220 forward or backward thereof.

In other words, an upper end portion of the electric motor 212 is provided with a pinion gear 213, and a rack gear 214 engaged with the pinion gear 213 is positioned on a lower end portion of the second guide rail 225 and therefore, the housing 220 may be slid depending upon the rotation of the electric motor 212.

Meanwhile, an upper end portion of the second storage unit 200 is provided with a radiation unit 300 and after the mobility 1000 stops, the radiation unit 300 may radiate a receiving position of the personal transportation 10 on the ground. In other words, the server 600 that receives the user's request for using the personal transportation 10 stored in the second storage unit 200 transmits the request to the controller 500, and the controller 500 may control the radiation unit 300 to radiate light on the ground 350 to inform the position of the second storage unit 200 after the mobility stops to inform the user of the position of the second storage unit 200.

Furthermore, the outsides of the entrance 120 of the first storage unit 100 and the housing 220 of the second storage unit 200 may be provided with the identification marks 400 configured for identifying the storage position of the personal transportation 10. The identification mark 400 is a mark for identifying the first storage unit 100 and the second storage unit 200, and referring to FIG. 1, the first storage unit denotes the mark in capital letters of the alphabet, and the second storage unit denotes the mark in Arabic numerals.

The identification mark 400 may be provided with the flashing light, and after the mobility 1000 stops, the flashing light of the identification mark 400 may flash such that the user may recognize the position at which the personal transportation 10 may be stored.

In other words, the identification mark 400 of the first storage unit 100 or the second storage unit 200 in which the personal transportation 10 is stored requested by the user is configured to inform the user of the position at which the personal transportation 10 is stored while flashing. Alternatively, it is natural that the identification mark 400 of the first storage unit 100 or the second storage unit 200 of which the user requests the use to store the personal transportation 10 may flash.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobility for storing a personal transportation, the mobility comprising:

a first storage unit formed on a side of the mobility and configured for storing the personal transportation therein without folding thereof;

a second storage unit formed on a side of the mobility and configured for storing the personal transportation therein after the personal transportation is folded;

a controller configured to control the first storage unit and the second storage unit in response to a mobility user's request; and a server configured to receive information related to whether the first storage unit and the second storage unit are used, and a remaining battery capacity, use time, and movable distance of the stored personal transportation from the controller, and to communicate with the mobility user, wherein the first storage unit includes:
 a first storage space storing the personal transportation and formed inside a seat of the mobility; and
 an entrance, through which the personal transportation enters or exits, formed outside the mobility.

2. The mobility for storing the personal transportation of claim 1,
 wherein the first storage unit and the second storage unit are provided with a charger configured for charging the personal transportation.

3. The mobility for storing the personal transportation of claim 1,
 wherein the second storage unit includes:
  a housing storing the folded personal transportation; and
  a second storage space storing the housing and formed inside the mobility.

4. The mobility for storing the personal transportation of claim 1, further including a personal transportation entrance auxiliary panel hingedly coupled to a lower end portion of the first storage unit.

5. The mobility for storing the personal transportation of claim 3,
 wherein the entrance is configured to be opened or closed vertically.

6. The mobility for storing the personal transportation of claim 3,
 wherein a first guide rail configured to guide a movement direction of the housing is fixed and formed in the second storage space, and
 wherein the housing is formed with a second guide rail configured to move the housing along the first guide rail.

7. The mobility for storing the personal transportation of claim 6,
 wherein the second storage space is provided with a motor configured to move the second guide rail forward or backward in accordance with a control of the controller.

8. The mobility for storing the personal transportation of claim 7, wherein an end portion of the motor is provided with a pinion gear, and a rack gear engaged with the pinion gear is positioned on an end portion of the second guide rail so that the housing slides according to rotation of the motor.

9. The mobility for storing the personal transportation of claim 1,
 wherein an upper end portion of the second storage unit is provided with a radiation unit and after the mobility stops, the radiation unit is configured to radiate a receiving position of the personal transportation on the ground.

10. The mobility for storing the personal transportation of claim 3,
 wherein the outsides of the entrance of the first storage unit and the housing of the second storage unit are provided with identification marks configured for identifying a storage position of the personal transportation.

11. The mobility for storing the personal transportation of claim 1,
 wherein the sides of the first storage unit and the second storage unit are provided with identification marks configured for identifying a storage position of the personal transportation.

12. The mobility for storing the personal transportation of claim 11,
 wherein the identification marks are provided with a flashing light, and
 after the mobility stops, the flashing light of the identification marks flashes so that the mobility user recognizes a position at which the personal transportation is stored.

13. The mobility for storing the personal transportation of claim 12,
 wherein after the mobility stops, the flashing light of the identification mark marks flashes so that the mobility user recognizes a storage position of an available personal transportation.

14. The mobility for storing the personal transportation of claim 1,
 wherein the server is configured to inform the mobility user of an available personal transportation stored in the first storage unit or the second storage unit or to inform the mobility user of the first storage unit or the second storage unit, which is currently empty.

15. The mobility for storing the personal transportation of claim 14,
 wherein the controller is further configured to receive the mobility user's request from the server to control the first storage unit or the second storage unit.

16. The mobility for storing the personal transportation of claim 15,
 wherein the controller is further configured to receive the mobility user's request from the server to control the first storage unit or the second storage unit so that the first storage unit or the second storage unit is opened or closed.

17. The mobility for storing the personal transportation of claim 2,
 wherein the controller is further configured to receive the mobility user's request from the server to control the charger to charge the personal transportation stored in the first storage unit or the second storage unit.

* * * * *